United States Patent Office 2,981,785
Patented Apr. 25, 1961

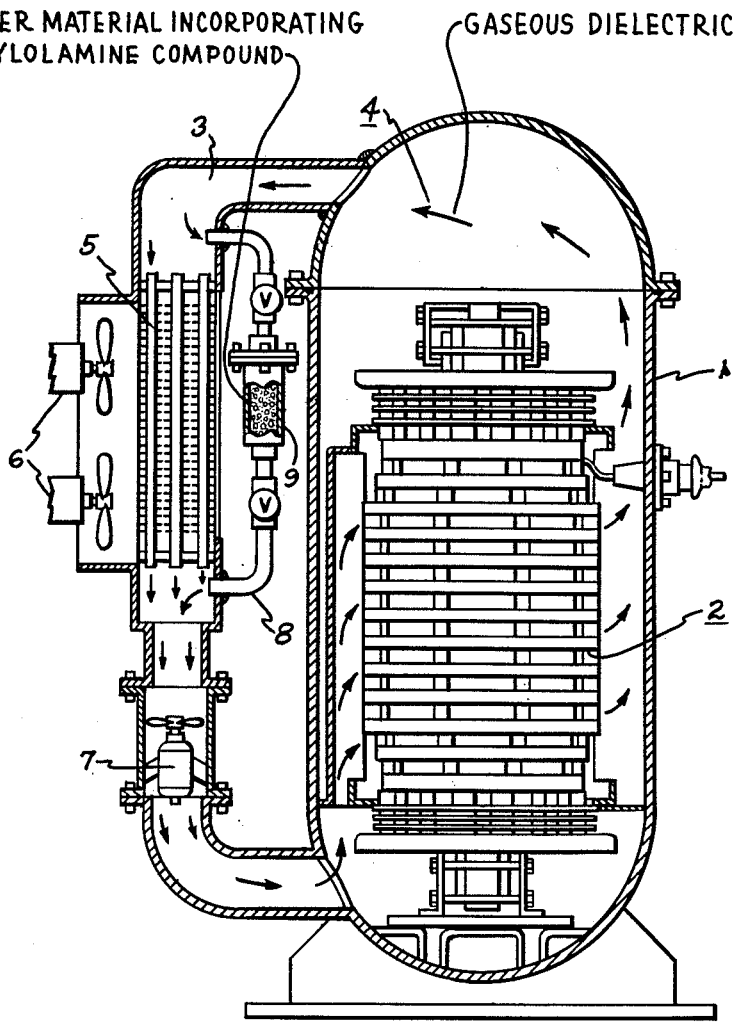

2,981,785

ELECTRICAL APPARATUS WITH GASEOUS DIELECTRIC AND PURIFYING MEANS THEREFOR

Ralph E. Plump, Pittsfield, Mass., assignor to General Electric Company, a corporation of New York Filed Oct. 15, 1956, Ser. No. 616,079

2 Claims. (Cl. 174—14)

The present invention relates to gas insulated electrical apparatus, and more particularly to purifying means for the gaseous dielectric medium incorporated in the electrical apparatus.

The use of gaseous dielectric media for electrical apparatus such as transformers has found favor due to such advantages over liquid dielectric materials as less weight non-flammability, improved heat transfer properties, and reduction in power consumption for forced circulation of the dielectric for cooling purposes. Various gaseous compounds have been suggested for use as transformer dielectrics, such as sulfur hexafluoride and halogen-combined hydrocarbons. In particular, gaseous fluoro-carbon compounds have been found advantageous as dielectric materials in such respects as dielectric strength and chemical stability. However, as the result of accidental electrical discharges, such as arcing, in the gas insulated electrical apparatus, many of the fluorogas dielectric materials have been found to produce gaseous decomposition products which are toxic in nature. Consequently, after the apparatus has been in operation for an extended period of time the toxic gas accumulated therein may be harmful to maintenance or repair personnel working on the apparatus.

It is an object of the invention to provide gas insulated electrical apparatus such as transformers which avoid the above disadvantages.

It is a further object of the invention to provide a purifying agent for inactivating the decomposition products of gaseous dielectric materials produced by electrical discharges or other effects in electrical apparatus containing such dielectric materials.

Other objects and advantages will become apparent from the following description and the appended claims.

In accordance with the invention, there is provided an electrical apparatus comprising an electrical device in a closed container, in which is incorporated a gaseous insulating medium subject to decomposition to produce toxic gaseous products, and purifying means comprising an alkylolamine compound for inactivating the toxic gaseous decomposition products. In a preferred embodiment of the invention, the alkylolamine compound is incorporated in a granular filter material such as activated alumina or soda lime serving as a carrier therefor, whereby the dielectric gas to be purified may be brought into intimate contact with the detoxifying agent.

The invention will be better understood from the following description taken in conjunction with the accompanying drawing in which the single figure is an elevational view in section of a transformer embodying the present invention.

Shown in the drawing is a transformer apparatus comprising a sealed tank 1 containing the transformer winding and core structure 2 and a gaseous dielectric medium which comprises a fluorinated hydrocarbon, such as those hereinafter described. As will be understood, the dielectric medium insulates parts of the apparatus which are at unequal potential and between which arcing may occur under certain conditions. A conduit 3 is arranged communicating with the interior of tank 1 for conducting the gaseous dielectric 4, indicated by arrows, to and from a cooling device comprising radiator 5 and fans 6, pump 7 in conduit 3 serving to circulate the gaseous dielectric therethrough. Connected into the main conduit 3 is a bypass conduit 8 through which a portion of the dielectric medium flows, and in which is located a filter device 9 containing purifying material of the composition hereinafter described for removing from the gas toxic and corrosive products as well as moisture. In general, it is preferable to arrange the filter so that the gas flow is vertical rather than horizontal, so as to ensure proper contact of the purifying material with the gas stream.

Among the reasons why it is preferred to locate the purifying material in a bypass instead of in either the main conduit 3 or the tank 1 are that if it is in the main conduit all of the gas will pass through the purifying material each time it makes a complete trip through the circulating system which is unnecessary but also undesirably increases the power required for circulating the gas. If the purifying material is in the tank 1, the surface contact between the purifying material and the gas will be inadequate unless the purifying material is spread out over an excessively large area. However, it should be understood that both of these non-preferred locations of the purifying material are within the scope of my invention in its broader aspects. In order to insure flow of gas through the filter, the bypass should be connected between points of different gas pressure in the system, the preferred connection being across the radiator 5, but it will be obvious that other suitable locations are across the pump 7 or around other constricted passages in the apparatus where there is a pressure drop.

It has been found, in accordance with the present invention, that alkylolamine and substituted alkylolamine compounds (hereinafter referred to generally as alkylolamine compounds) are extremely effective in removing or rendering harmless the decomposition products of gaseous dielectric materials employed in electrical apparatus, particularly those of fluoro-carbon composition. The invention is generally applicable to purification of fluorinated hydrocarbons and in particular, it appears that the present purifying material has a marked affinity for and reactivity with toxic olefinic decomposition products of such dielectric materials. Gaseous dielectric materials which appear to produce such olefinic decomposition products, due to arcing and the like and which are especially suitable for treatment with the present alkylolamine compounds are the perfluoroalkanes of the homologous series represented by the general formula $C_nF_{2n+2}$, and cyclo-fluoro-carbons such as perfluoro-cyclo-butane, $c$-$C_4F_8$, and mixtures of such compounds. Examples of the perfluoroalkanes are hexafluoroethane $C_2F_6$, octafluoropropane $C_3F_8$, and decafluorobutane $C_4F_{10}$. The latter fluoro-carbon gas, by way of illustration, appears to produce by arcing decomposition the unsaturated compound perfluorobutene-2, which has been effectively neutralized in tests using the present purifying materials. Other types of fluoro-gases which produce olefinic decomposition products may also be satisfactorily treated by the present detoxifying agents.

While the improvement provided by the present invention is primarily with respect to the above dielectric materials and the removal of their harmful olefinic decomposition products, it will be understood that other gaseous dielectric components, such as $SF_6$ and nitrogen may, if desired, be present in the electrical apparatus along with the above gaseous dielectrics to which the present detoxifying materials are applicable.

As purifying materials, it has been found that primary and secondary alkylolamine compounds are particularly effective in removing the toxic decomposition products, and of these the primary alkylolamine compounds have been observed to be markedly superior in the rate of reaction. Examples of primary alkylolamine compounds which may be used in practicing the invention are monoethanolamine, 1-hydroxy 4-amino butane, butyl ethanolamine, isobutanolamine, and hydroxyethyl trihydroxypropyl ethylenediamine. Illustrative of secondary alkylolamines which may be used are diethanolamine, phenylethanolamine and orthotolylpropanolamine.

Although the primary alkylolamine compounds are generally preferable to the secondary alkylolamines in view of their more rapid detoxification of the olefinic gaseous products, it may often be desirable in particular cases to use one or more specific alkylolamine compounds of either or both types.

It is preferred, in practicing the present invention, to incorporate the alkylolamine purifying material, which is normally in liquid state, in a granular filter material which serves as a carrier therefor and which facilitates the necessary contact between the purifying agent and the gas to be treated. Examples of suitable carrier materials are activated alumina, soda lime, vermiculite, granular fuller's earth, silica gel, and synthetic zeolite. In particular, activated alumina or soda lime or a combination of both appear especially satisfactory as carrier filter materials. In a typical embodiment, granular activated alumina impregnated with the desired alkylolamine compound may be disposed homogeneously in the filter device 9 shown in the figure. In other embodiments, a layer of alkylolamine-impregnated activated alumina may be superposed on a layer of untreated activated alumina, or vice versa, arrangements which ensure the retention of any vaporized alkylolamine passing out of the impregnated layer into the untreated layer.

While such combination of the purifying agent with a granular carrier material is generally preferred as a practical matter, the carrier material may in the broad aspects of the invention be dispensed with, and the alkylolamine compound used alone in a suitable container in a manner to ensure its contact with the dielectric gas to be purified.

The exact mechanism of the purifying action of the alkylolamine compounds on the gaseous dielectric decomposition products is not fully known, but the following explanation for the reaction appears reasonable, it being understood that the explanation offered is in no way binding or limiting. It appears that the olefinic compounds produced by arcing conditions in the electrical apparatus have a strong affinity for the alkylolamine compounds due perhaps to the reactivity of fluoro-olefins to hydroxy and amine groups, both of which are present in the alkylolamine compounds. It appears that by such chemical reaction with the olefinic products the latter compounds become saturated and thereby effectively neutralized and detoxified. It does not appear that merely an acid neutralization or other ionic reaction is involved, since strongly basic materials alone, such as soda lime, have not been found effective for detoxifying the gaseous decomposition compounds. It has also been observed that activated alumina alone, a commonly used adsorbent filter material, is ineffective for this purpose. It has, however, been discovered that although soda lime alone does not effectively purify the gaseous decomposition products, its combination with the alkylolamine compounds in accordance with the invention produces a marked improvement in the olefin purifying reaction as compared to other carrier materials, and it is believed accordingly that the chemical reaction between the alkylolamine compound and the olefinic products may be base-catalyzed. This theory may also account for the better results obtained by the use of primary alkylolamine compounds, which are more strongly basic than the secondary alkylolamine compounds.

In a series of tests wherein rats were subjected to samples containing a concentration of 20% by volume of arced octafluoropropane, a sample untreated with any purifying agent and a sample treated with activated alumina each produced fatal lung hemorrhages in rats exposed thereto for about 1½ hours. When rats were subjected for 2½ to 3 hours to a similar sample of gas treated with ethanolamine incorporated in alumina, no lung hemorrhage or other harmful effects were observed in the rats.

Tests were also conducted to determine the relative efficiency of various agents in removing toxic olefinic gases, wherein the relative rise of a mercury column into a space occupied by an olefinic fluoro-gas and the selected purifying agent indicated the degree of removal of the fluoro-gas. The tests showed that dry soda lime alone or in combination with activated alumina had practically no effect in removing the toxic fluoro-gas, whereas an equivalent amount of monoethanolamine over the same period removed nearly all of the olefinic gas sample. Isobutanolamine used alone removed about half the olefinic fluoro-gas in the same period, and when used with the soda lime-activated alumina combination was considerably more rapid in reaction.

In addition to the observed effectiveness of the alkylolamine reagents in purifying fluoro-carbon dielectric gases as described, the present purifying materials have numerous other advantages in their application to electrical apparatus as disclosed, such as generally low vapor pressure and high boiling points, compatibility and good sorption with the carrier filter materials, and in being readily available at moderate cost.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. Electrical apparatus comprising, in combination, a closed container, an electrical device in said container having spaced parts at unequal potential between which arcing may occur under certain conditions, a gaseous insulating medium in said container between said parts comprising a fluoro-gas selected from the group consisting of perfluoroalkanes, perfluoro-cyclo-butane, and mixtures thereof, said fluoro-gas being subjected to arcing decomposition producing toxic olefinic gaseous decomposition products of said fluoro-gas, and means in contact with said gaseous insulating medium and comprising an alkylolamine for reacting with and thereby detoxifying said toxic olefinic gaseous decomposition products.

2. The method of detoxifying a fluoro-gas dielectric medium selected from the group consisting of perfluoroalkanes, perfluoro-cyclo-butane, and mixtures thereof and containing olefinic gaseous decomposition products of said compounds which comprises contacting said dielectric medium and reacting said decomposition products with an alkylolamine.

References Cited in the file of this patent

UNITED STATES PATENTS

| | | |
|---|---|---|
| 1,946,195 | Daudt | Feb. 6, 1934 |
| 2,149,039 | Benning | Feb. 28, 1939 |
| 2,505,581 | Unger | Apr. 25, 1950 |
| 2,654,583 | Treanor | Oct. 6, 1953 |
| 2,738,371 | Parmelee | Mar. 13, 1956 |
| 2,818,323 | Haensel | Dec. 31, 1957 |
| 2,853,540 | Camilli | Sept. 23, 1958 |

FOREIGN PATENTS

| | | |
|---|---|---|
| 525,244 | Great Britain | Aug. 23, 1940 |

OTHER REFERENCES

"Alkyolamines," A New Dictionary of Chemistry by Stephen Miall, page 19, published by Longmans, Green and Co., 1940.

UNITED STATES PATENT OFFICE
CERTIFICATE OF CORRECTION

Patent No. 2,981,785

April 25, 1961

Ralph E. Plump

It is hereby certified that error appears in the above numbered patent requiring correction and that the said Letters Patent should read as corrected below.

Column 4, line 44, for "subjected" read -- subject --.

Signed and sealed this 26th day of September 1961.

(SEAL)
Attest:

ERNEST W. SWIDER
Attesting Officer

DAVID L. LADD
Commissioner of Patents

USCOMM-DC